Dec. 9, 1969 W. J. KUDLATY 3,482,846
DUAL SEAL
Filed Nov. 6, 1967
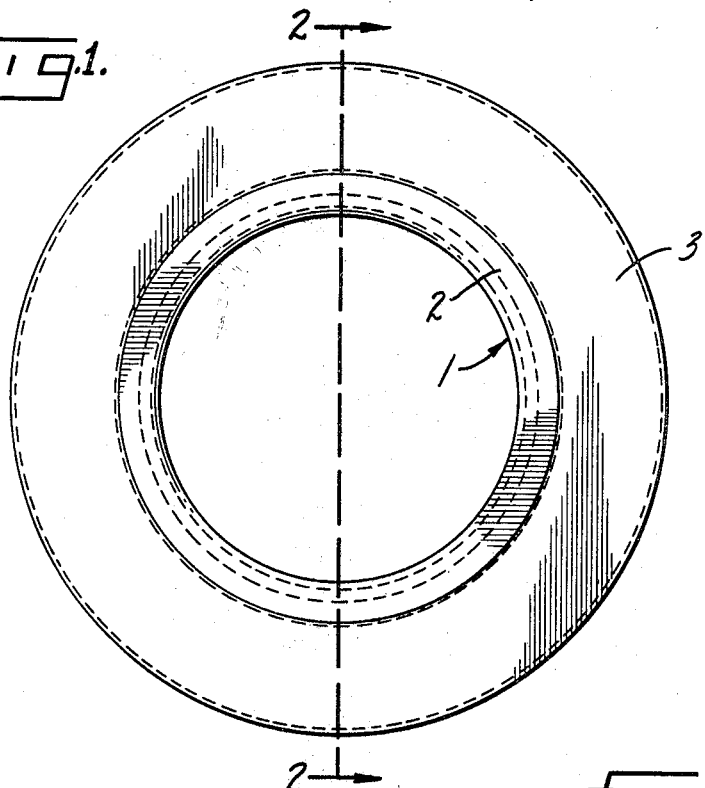
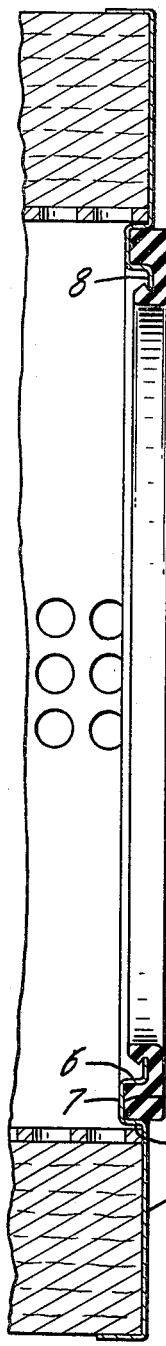
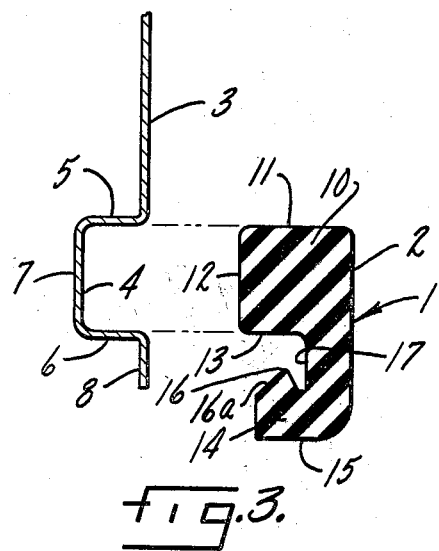
INVENTOR.
Walter J. Kudlaty,
BY Parker & Carter
Attorneys.

United States Patent Office 3,482,846
Patented Dec. 9, 1969

3,482,846
DUAL SEAL
Walter J. Kudlaty, Elmhurst, Ill., assignor to Marvel Engineering Co., Chicago, Ill., a corporation of Illinois
Filed Nov. 6, 1967, Ser. No. 680,808
Int. Cl. F16j 15/00, 15/32
U.S. Cl. 277—178                                      1 Claim

ABSTRACT OF THE DISCLOSURE

A seal formed and designed for engagement in a suitable holder and presenting both radial and annular sealing surfaces.

SUMMARY OF THE INVENTION

A seal in the form of a ring having an annular end surface effective to serve as an end seal and a circumferential diameter surface effective to serve as a radial seal.

This invention relates to seals and particularly to a seal having a dual or alternate sealing function.

One purpose of the invention is to provide a seal which may be employed alternately as an end seal between abutting elements and a radial seal between interpenetrating elements.

Another purpose is to provide a seal which may serve simultaneously to seal abutting and interpenetrating elements.

Another purpose is to provide a seal and a holder therefor.

Another purpose is to provide a seal and holder assembly having configurations effective to retain said seal in desired position.

Other purposes will appear from time to time during the course of the specification and claims.

The invention is illustrated more or less diagrammatically in the accompaying drawings wherein:

FIGURE 1 is an end view;

FIGURE 2 is a view taken on the line 2—2 of FIGURE 1, and

FIGURE 3 is a cross-sectional detailed view on an enlarged scale.

Like parts are indicated by like numerals throughout the specification and drawings.

Referring now to the drawings, it will be noted that the seal 1 has a planar ring configuration, having an annular outer or sealing surface 2. A holder 3 for the seal 1 has a recess portion 4 defined by an outer circumferential wall portion 5 and an inner circumferential wall portion 6, the base of the recess 4 being defined by an annular wall portion 7. A second annular wall portion or flange 8 extends inwardly from the upper or outer edge of the circumferential wall portion 6.

Referring now to FIGURE 3, it will be seen that the seal 1 may be considered as generally U-shaped in cross-section and includes a major annular segment 10 formed and adapted for seating snugly within the recess 4. The seal 1 has an outer circumferential wall surface 11 of somewhat longer axial extension than the outer circumferential wall 5. The portion 10 has a rear annular wall surface 12 substantially equal to the wall 7 when the portion 10 is seated in recess 4. It will be understood that the ring seal 1 may be of slightly less diameter than the holder provided therefore, the seal 1 being somewhat stretched to seat within said holder, without departing from the nature and scope of the invention. The portion 10 has an inner circumferential surface 13 of less axial extension than surface 11 and of substantially the axial extension of circumferential wall portion 6 of the holder.

It will be observed that an annular groove is formed in the ring 1 and that surface 2 is of sufficient radial extension to bridge across the area from wall 5 and beyond annular flange 8 of the holder 3. A second rearward segment 14 of the seal 1 extends rearwardly beyond flange 8 and includes a radially sealing, circumferential surface 15. The portion 14 has an inner circumferential wall surface defining a ridge 16. The ridge 16 is axially spaced from a rear annular surface 17 positioned for contact with the outer surface of flange 8, the ridge 16 being effective to extend behind the wall 8 and thus to retain the seal in place, the segment 14 being cammed out of the position shown, for example, in FIGURE 3, upon installation of the ring of the seal upon the holder 3, by engagement of the inclined rear surface 16a of ridge 16 with the edge of flange 8. The spacing of ridge 16 from surface 17 is sufficient just to receive flange 8 therebetween.

Whereas there has been described a suitable seal having particular configurations, it will be realized that variances therein may occur to those skilled in the art, without departing from the nature and scope of the invention.

The use and operation of the invention are as follows:

The holder may be employed in a variety of structures, the employment shown in FIGURE 2, for example, being suitable for a filter element, an end portion of which is shown in FIGURE 2. In such instance the holder 3 serves, in fact, as an end cap for a tubular filter element. It will be realized that a second filter element (not shown) of substantially identical design and carrying a substantially identical seal could be placed in abutment with that shown, the opposed surfaces 2 of the seals abutting and being held together to seal against the escape of fluid therebetween.

Alternatively, or simultaneously, a suitable interpenetrating element, such as the sleeve of a filter housing, for example, could extend through the seal 1, and engage the circumferential sealing wall surface 15 thereof to provide a radial seal against the passage of fluid therebetween.

The configuration of the seal as illustrated, for example, in FIGURE 3, in cooperation with the holder 3 is effective to provide for a snap-action fitting of the seal in the holder and the retention of the seal thereon.

I claim:

1. A seal comprising a ring of flexible material, said ring having an annular, axially sealing surface and a circumferential, radially sealing surface, said ring having an annular groove formed and adapted for receiving a holder, a holder for said seal, a recess in said holder, a flange on said holder, an enlargement on said ring, a ridge on said ring, said recess being formed and adapted to receive said enlargement, said ridge being formed and adapted to engage said flange, said flange seating within said groove.

References Cited

UNITED STATES PATENTS

| 2,915,326 | 12/1959 | Mason | 277—178 |
| 2,926,938 | 3/1960 | Ratti | 277—186 |
| 3,129,021 | 4/1964 | Willis et al. | 277—205 X |
| 3,178,191 | 4/1965 | Dodd et al. | 277—189 X |

SAMUEL ROTHBERG, Primary Examiner

U.S. Cl. X.R.

210—457; 277—189